(12) United States Patent
Rosier

(10) Patent No.: US 12,654,488 B2
(45) Date of Patent: Jun. 16, 2026

(54) DEVICE FOR PROTECTING A TYRE SIDEWALL

(71) Applicant: MUSTHANE (SOCIÉTÉ PAR ACTIONS SIMPLIFIÉE), Willems (FR)

(72) Inventor: Reza Rosier, Dottignies (BE)

(73) Assignee: MUSTHANE (SOCIÉTÉ PAR ACTIONS SIMPLIFIÉE, Willems (FR)

( * ) Notice: Subject to any disclaimer, the term of this patent is extended or adjusted under 35 U.S.C. 154(b) by 364 days.

(21) Appl. No.: 18/025,694

(22) PCT Filed: Sep. 6, 2021

(86) PCT No.: PCT/EP2021/074445
§ 371 (c)(1),
(2) Date: Mar. 10, 2023

(87) PCT Pub. No.: WO2022/053421
PCT Pub. Date: Mar. 17, 2022

(65) Prior Publication Data
US 2023/0339260 A1     Oct. 26, 2023

(30) Foreign Application Priority Data
Sep. 10, 2020    (FR) ...................................... 2009168

(51) Int. Cl.
*B60B 7/01*       (2006.01)
*B60B 7/04*       (2006.01)
*B60B 7/06*       (2006.01)

(52) U.S. Cl.
CPC .................. *B60B 7/01* (2013.01); *B60B 7/04* (2013.01); *B60B 7/063* (2013.01);
(Continued)

(58) Field of Classification Search
CPC .............. B60B 7/01; B60B 7/063; B60B 7/04
See application file for complete search history.

(56) References Cited

U.S. PATENT DOCUMENTS 1,905,674 A  *  4/1933  Alfred ....................... B60B 7/00
                                                    152/154
2,970,009 A      1/1961  Lyon
                    (Continued)

FOREIGN PATENT DOCUMENTS

DE       202018104619 U1    11/2019
EP           0007981 A1 *    2/1980
                    (Continued)

OTHER PUBLICATIONS

International Search Report from PCT Application No. PCT/EP2021/074445, Nov. 12, 2021.
(Continued)

*Primary Examiner* — Kip T Kotter
(74) *Attorney, Agent, or Firm* — Workman Nydegger

(57)        ABSTRACT

A device for protecting the tire of a wheel, includes a shield having a polymer material; a crown for mounting the protection device on a rim of the wheel, the crown being secured to the shield and including: a connection portion for securely connecting the crown to the shield; a mounting portion, forming a single piece with the connection portion, provided with a plurality of orifices for mounting the crown on the rim, the mounting portion including a plurality of lug-shaped protuberances distributed along the circumference of the mounting portion while being angularly spaced from each other, each protuberance radially protruding towards the center of the crown and comprising an orifice.

20 Claims, 4 Drawing Sheets

(52) U.S. Cl.
CPC ....... *B60B 2360/10* (2013.01); *B60B 2360/32*
(2013.01); *B60B 2900/212* (2013.01)

(56)                    References Cited

U.S. PATENT DOCUMENTS

| | | | | |
|---|---|---|---|---|
| 4,235,271 | A * | 11/1980 | Olsen ........................ | B60B 7/01 |
| | | | | 152/154 |
| 4,790,362 | A | 12/1988 | Price | |
| 8,876,222 | B2 | 11/2014 | Seradarian et al. | |
| 9,895,927 | B2 | 2/2018 | Seradarian et al. | |
| 10,434,819 | B2 * | 10/2019 | Renson ................ | B60B 7/0026 |
| 2007/0290548 | A1 | 12/2007 | Lundy | |
| 2009/0315389 | A1 * | 12/2009 | Seradarian ................ | B60B 7/01 |
| | | | | 301/8 |
| 2010/0066155 | A1 | 3/2010 | Seradarian et al. | |
| 2014/0197674 | A1 * | 7/2014 | Woolley ................... | B60B 7/01 |
| | | | | 301/5.21 |

FOREIGN PATENT DOCUMENTS

| | | | |
|---|---|---|---|
| EP | 2293951 | B1 | 2/2013 |
| WO | 8901878 | A1 | 3/1989 |

OTHER PUBLICATIONS

French Search Report from FR Application No. 2009168, May 27, 2021.

* cited by examiner

[Fig. 1]
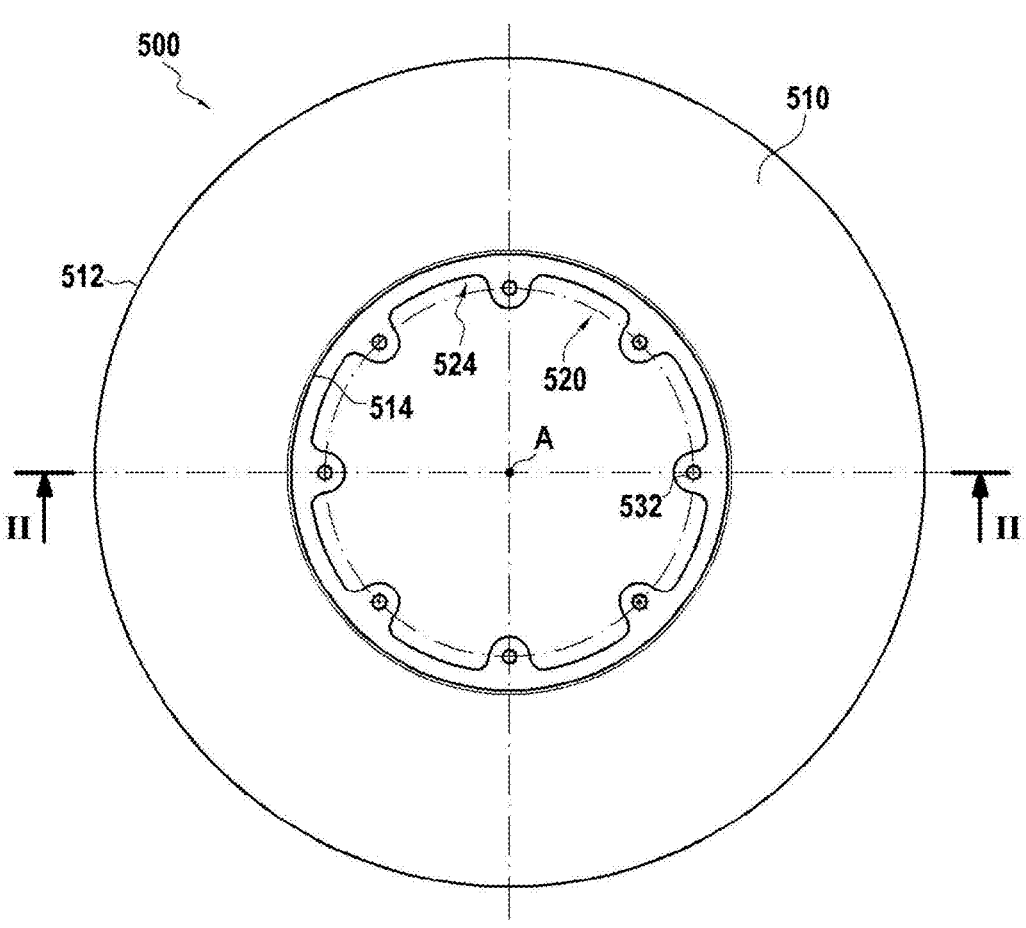

[Fig. 2]
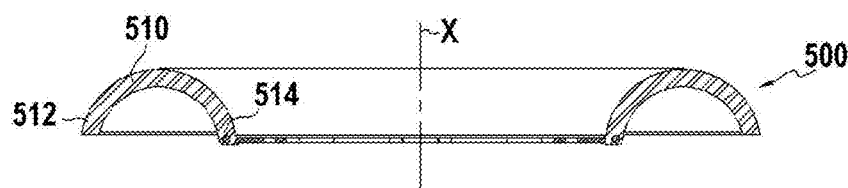
[Fig. 3]
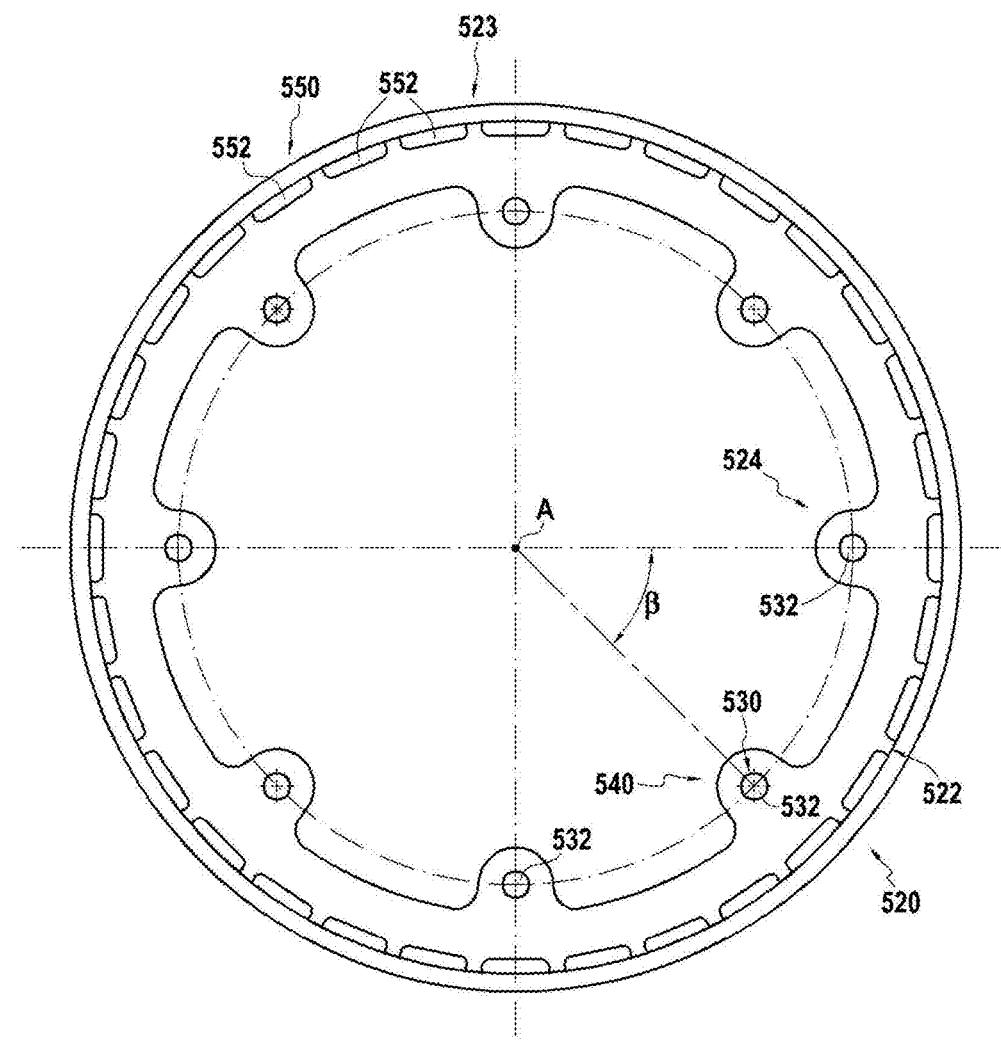

[Fig. 4]
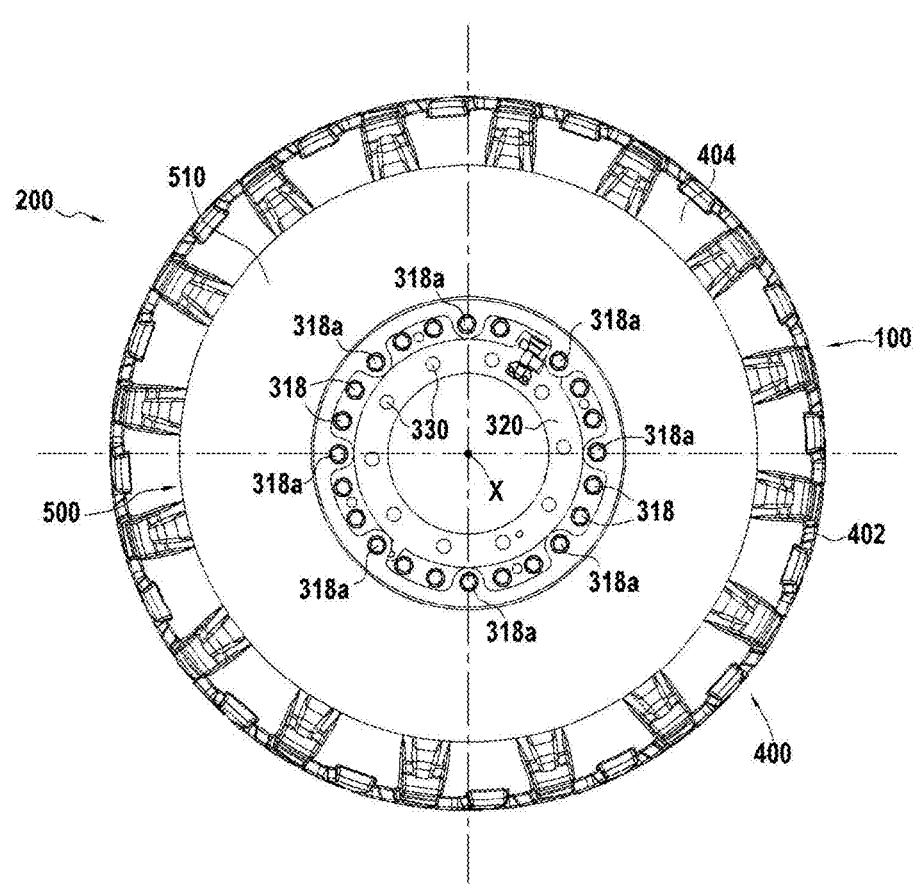
[Fig. 5]
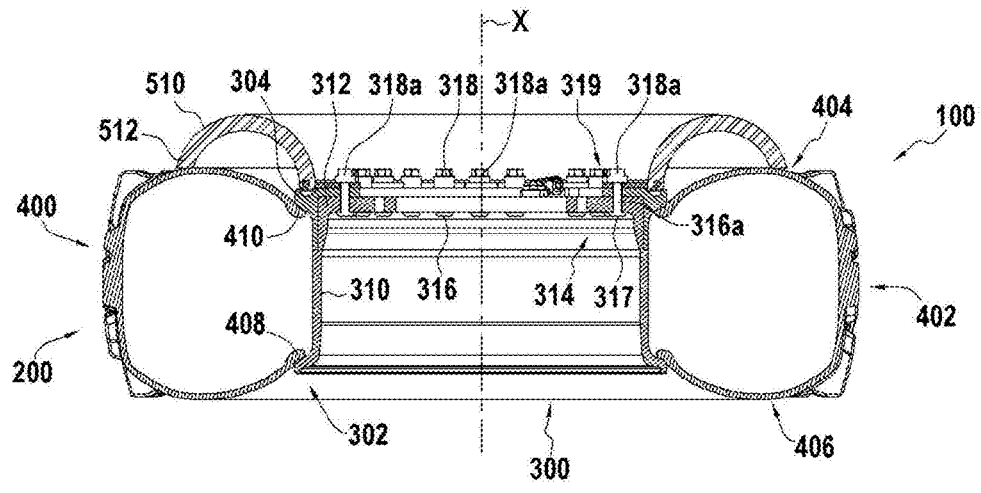

[Fig. 6]
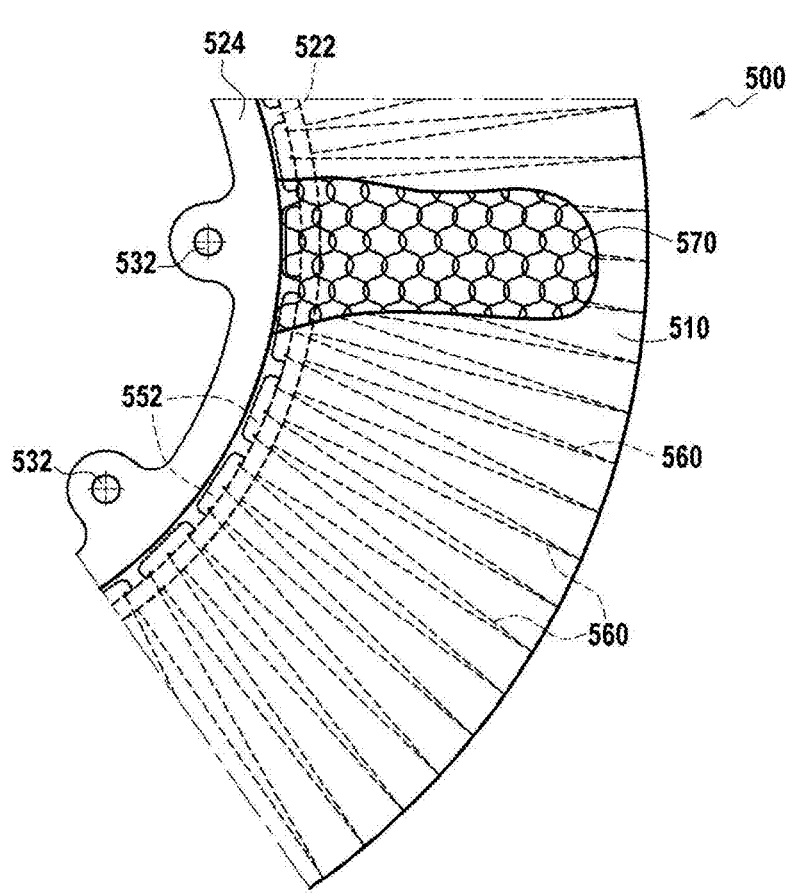

DEVICE FOR PROTECTING A TYRE SIDEWALL

TECHNICAL FIELD

The present invention relates to the field of the protection of a tire of a vehicle wheel, such as a mining or military truck or an off-road vehicle. As this type of vehicle is intended to operate on uneven grounds, it is common for the sidewalls of the tires of the vehicle to be subjected to impacts capable of damaging or puncturing the tire, which may require the immobilization of the vehicle in order to proceed with the necessary repairs.

The invention more particularly relates to a device for protecting the tire of a wheel, as well as a rolling assembly including a wheel and such a protection device.

PRIOR ART

To limit the risk of damage to the tires of off-road vehicles, it is known to use tire protection devices. Generally, these protection devices are designed to protect the sidewalls of the tires.

Such a protection device is in particular described in document US 2010/0066155. As illustrated in FIGS. 10 and 11 of this prior document, this device includes an annular shield 1 having an internal peripheral edge sandwiched between a ring 7 and a mounting part 10, the ring 7 and the mounting part being fixed to each other by a screw 9. The mounting part 10 is for its part fixed to the rim 4 by a screw 15.

The structure of this protection device, comprising many parts, is particularly complex, which makes the mounting of the wheel protection device difficult and time-consuming when the vehicle is on site or in a theater of military operations.

DISCLOSURE OF THE INVENTION

The present invention aims in particular to propose a more robust protection device whose mounting on the rim is simpler and faster than the aforementioned previous device.

To do so, the invention relates to a device for protecting the tire of a wheel including:

a shield having an annular shape and comprising a polymer material, the shield having an outer peripheral edge and an inner peripheral segment opposite to the outer peripheral edge;

a crown for mounting the protection device on a rim of the wheel, the crown having a center and being secured to the shield and comprising:

a connection portion for securely connecting the crown to the shield;

a mounting portion, forming a single piece with the connection portion, provided with a plurality of mounting elements for mounting the crown to the rim, the mounting portion being radially located between the center of the crown and the connection portion and including a plurality of lug-shaped protuberances distributed along the circumference of the mounting portion while being angularly spaced from each other, each protuberance radially protruding towards the center of the crown and comprising at least one of the mounting elements.

The protuberances therefore form a single piece with the mounting portion and with the connection portion of the crown. This unitary structure, which requires fewer parts than the device of the prior art, offers a better robustness. Furthermore, as the protection device according to the invention requires fewer fixing screws than the previous device, its manufacture and especially its implementation are facilitated, in particular in the field. Furthermore, the mounting and dismounting time is shorter than with the previous device.

It is moreover understood that the lug-shaped protuberances constitute radial protrusions angularly distributed along the circumference of the internal periphery of the crown. Preferably, but not necessarily, the angular distance between two adjacent mounting elements is identical for all the mounting elements.

Preferably, the protuberances extend in the same plane as the connection portion. Without departing from the scope of the present invention, the protuberances could be inclined, in order to conform to the structure of the rim.

The outer peripheral edge of the shield is configured to bear against the sidewall of the tire. This allows not only protecting the sidewall of the tire against the side impacts but also preventing stones or other objects from getting stuck between the shield and the sidewall of the tire.

The shield preferably has a bent annular shape. In other words, the cross section of the shield is curved or rounded. This curvature is dimensioned in such a way as to absorb the variation in the curve of the tire during all the driving phases, and whatever the level of inflation of the tire.

Still preferably, the shield is a composite element including, in addition to the polymer material, several draped layers of fabrics.

Advantageously, the mounting elements comprise orifices to receive members for fixing the rim.

These fixing members are composed for example of studs or threaded rods, for example the studs that participate in fixing the portions of the rims together in the case of the rims composed of several portions.

It is understood that the orifices are arranged in the protuberances and composed of drillings whose axes are parallel to the axis of the crown.

Preferably, each protuberance includes one of the orifices. Still preferably, each protuberance includes one and only one of the orifices.

According to one preferred embodiment, the mounting portion radially extends towards the center of the crown out of the inner peripheral segment of the shield.

Advantageously, the connection portion is embedded in the inner peripheral segment of the shield. In other words, the connection portion is sealed in the polymer material constituting the shield. An interest is to allow a connection between the crown and the shield that is devoid of screws, in order to facilitate the manufacture and increase the robustness of the protection device according to the invention, then no fixing element, such as a screw for example, being exposed to impacts or liquids.

To improve the connection between the crown and the shield, the connection portion preferably includes holding elements, and the protection device further includes textile yarns which cooperate with the holding elements while being embedded in the polymer material.

The cooperation between the holding elements and the textile yarns ensures the holding between the yarns and the crown; at the same time, the yarns are sealed in the polymer material constituting the shield.

According to one preferred embodiment, the holding elements are holes which axially pass through the crown by being disposed along the circumference of the fixing portion, the textile yarns being engaged in the holes so as to extend on either side of the connection portion. The holes preferably have an oblong shape and are distributed along the circumference of the fixing portion.

This arrangement allows on the one hand guaranteeing the rigidity of the connection between the crown and the shield in the direction of the draping and on the other hand promoting keeping the shield on the crown.

Advantageously, the polymer material is an elastomer, preferably a styrene-butadiene (SBR). The inventors have observed that the shield made from this material has very good abrasion resistance and good tear strength.

To improve the tear resistance of the shield, the shield further includes at least one reinforcement preferably a knitted fabric made from metal yarns.

Preferably, the crown is metallic, for example made of steel.

According to one advantageous aspect of the invention, the outer peripheral edge extends in a plane which is substantially coplanar with the crown.

As the sidewall of the tire is generally curved, the face of the rim is set back from the sidewall. Also, when the protection device is set up, the outer peripheral edge comes into contact against the sidewall of the tire before the crown is fixed to the rim. If necessary, the user must exert a slight axial thrust on the crown in order to finalize the fixing of the crown to the rim. This has the effect that the shield, seeking to regain its initial shape in which the outer peripheral edge is substantially in the same plane as the crown, undergoes a deformation stress which tends to press the outer peripheral edge against the sidewall of the tire. One advantage is to ensure a permanent contact between the shield and the sidewall of the tire, so as to prevent or at the very least significantly limit the entry of materials or objects between the shield and the tire.

Preferably, the protection device according to the invention is made in a mold that presents the conformation of the shield, the textile layers of the composite material constituting the shield being draped. The assembly is then vulcanized in an autoclave.

The invention also relates to a rolling assembly including:
  a wheel comprising a rim provided with an internal flange and an external flange, and a tire having at least one sidewall as well as first and second beads mounted against the internal and external flanges of the rim; and
  a protection device according to the invention, the crown being fixed to the rim.

Preferably, the outer peripheral edge of the shield contacts the sidewall of the tire by exerting a pressure against said sidewall.

As explained above, this contact ensures the contact between the shield and the tire and thus prevents foreign bodies from getting stuck between the shield and the tire, which could damage the tire.

According to one preferred but not exclusive embodiment, the rim is composed of a first rim portion including the internal flange, and of a second rim portion including the external flange, the first and second rim portions being fixed to each other by fixing members, and the crown mounting elements are mounted on at least some of the fixing members.

This type of rim in two portions, known otherwise, allows in particular simplifying the mounting of the tire on the rim.

Thanks to the invention, the mounting of the protection device on the rim is quick and does not require any specific equipment other than the components and tools usually used to mount or dismount the first and second rim portions relative to each other.

It is therefore understood that the protuberances are engaged with at least some of the fixing members.

According to one particularly advantageous embodiment of the invention, the number of mounting elements is strictly smaller than the number of fixing members, preferably less than or equal to half the number of fixing members.

One advantage is to allow rapidly mounting the protection device on the rim, without risking the disassembly of the first and second rim portions from each other.

Preferably, the crown is fixed via the mounting elements to one every two or every three fixing members.

By way of example, for a wheel whose rim comprises twenty-three fixing members, it is possible to provide eight mounting elements, that is to say eight protuberances and eight orifices.

Also, at least one, preferably two, of the rim fixing members, not used for mounting the crown, is disposed between two adjacent protuberances.

According to one preferred embodiment, the fixing members comprise threaded rods cooperating with nuts. The fixing members preferably comprise studs axially protruding from the second rim portion.

These studs cooperate with nuts which hold the first and second rim portions together. The studs are held in the first rim portion and pass through holes arranged in the second rim portion. Nuts are screwed to the studs so that the second rim portion is blocked between the nuts and the first rim portion.

To mount the protection device on the wheel, the operator only unscrews the nuts from the studs (or threaded rods) provided to engage in the orifices of the protuberances, then positions the crown so that the studs devoid of nuts engage through the orifices. Then, where appropriate, the crown is pressed against the second rim portion. Finally, the user retightens the nuts which have been previously removed in order to block the crown in the rim, the crown therefore being blocked between the nuts and the second rim portion. As mentioned above, the thickness of the mounting portion is dimensioned so that the threads of the retightened nuts are engaged on the studs over the entire length of the threads of the nuts in order to maintain a correct fixing between the first and second rim portions.

DESCRIPTION OF THE DRAWINGS

The invention will be better understood upon reading the following description of one embodiment of the invention given by way of non-limiting example, with reference to the appended drawings, in which:

FIG. 1 illustrates, in front view, one embodiment of the tire protection device according to the invention;

FIG. 2 is a side sectional view of the tire protection device of FIG. 1;

FIG. 3 is front view of the crown of the tire protection device of FIG. 1;

FIG. 4 illustrates, in front view, a rolling assembly according to the invention comprising a truck wheel on which the tire protection device of FIG. 1 is mounted;

FIG. 5 is a side sectional view of the rolling assembly of FIG. 4; and

FIG. 6 is a partial view of the device of FIG. 1 illustrating the fixing yarns and, in partial section, the knitted metal fabric.

DETAILED DESCRIPTION

FIGS. 4 and 5 illustrate one embodiment of a rolling assembly 100 in accordance with the present invention. This rolling assembly 100 includes a wheel 200, in this example a truck wheel, which comprises a rim 300 provided with an internal flange 302 and an external flange 304.

When the wheel 200 is mounted on the truck, the internal flange 302 is the one that is on the side of the axle, while the external flange 304, opposite to the internal flange, is located on the external side of the vehicle.

In known manner, the internal and external flanges 302, 304 have an annular shape, while the rim has the general shape of a ferrule with an axis X corresponding to the axis of rotation of the wheel 200.

In this example, the rim comprises a first rim portion 310 which includes the internal flange 302, as well as a second rim portion 320 which includes the external flange 304. As understood with FIG. 5, the first rim portion 310 includes an axial length which is substantially equal to the axial length of the rim, while the second rim portion 320 has a strapping shape shaped to engage with a first end portion 312 of the first rim portion 310 which is opposite to the internal flange 302.

It is understood that the first and second rim portions 310, 320 are coaxial along the axis X.

Referring to FIG. 4, it is observed that the first rim portion furthermore includes drillings 330 which are disposed radially inside the fixing members, these drillings being ten in number, and being intended to cooperate with the studs of the axle hub.

The first and second rim portions are fixed to each other by fixing members 314 which include studs 316 and nuts 318.

As understood from FIG. 5, the studs 316 have a first end comprising a shoulder 317 which abuts against an inner face of the first end portion 312 of the first rim portion 310, this inner face being perpendicular to the axis X.

The studs 316 extend along a direction parallel to the axis X, each stud 316 moreover includes an end 319—opposite to the shoulder 317—which is threaded, and which is configured to cooperate with one of the nuts 318. The first rim portion is provided with holes in which the studs 316 are engaged.

It is therefore understood that the second rim portion 320 is fixed to the first rim portion by being sandwiched between the nuts 318 and the first rim portion 310. In this example, the rim includes twenty-three studs which participate in fixing the first and second rim portions 310, 320 to each other.

It is moreover noted that the fixing members are disposed along the circumference of the rim and more particularly on a circumference of the second rim portion 320.

The wheel 200 moreover includes a tire 400 having a tread 402 which is located between an external sidewall 404 and an internal sidewall 406. The tire 400 further includes, in known manner, a first bead 408 and a second bead 410, the first bead 408 being mounted against the internal flange 302 of the rim 300, while the second bead 410 is mounted against the external flange 304 of the rim.

In known manner, to mount the tire 400 on the rim 300, the tire is first engaged on the first rim portion 310, after which the second rim portion 320 is assembled with the first rim portion 310 so as to engage the studs 316 of the first rim portion 310 in the orifices of the second rim portion 320. Then, the nuts 318 are screwed to secure the first and second rim portions 310, 320 together.

In accordance with the invention, the rolling assembly 100 moreover includes a protection device 500 intended to protect the tire 400 of the wheel 200, and more specifically the external sidewall 404 of the tire 400.

As understood in FIGS. 4 and 5, the protection device 500 is mounted on the rim 300 so as to protect the external sidewall 404 of the tire 400.

Referring to FIGS. 1 and 2, it is observed that the protection device 500 includes a shield 510 having an annular shape. In this example, the shield 510 is composed of a composite material comprising a polymer material, preferably an elastomer and even more preferably a styrene-butadiene (SBR).

Referring again to FIG. 4, it is observed that the shield 510 is shaped to cover part of the external sidewall 404, so as to protect this sidewall against side impacts that could damage the tire. For example, as shown, the shield 510 may extend radially over at least half of a radial height of the sidewall 404.

The shield 510 comprises an outer peripheral flange 512 which, as illustrated in FIG. 5, is shaped to bear against the external sidewall 404. The shield moreover includes an inner peripheral segment 514, which is opposite to the outer peripheral edge, and which will be described in more detail below.

With reference to FIG. 2, illustrating the shield in section in a plane containing the axis X, it is observed that the cross section of the shield 510 has a rounded shape shaped so that the hollow is located between the shield and the external sidewall 404.

The protection device 500 moreover includes a crown 520 for mounting the protection device on the rim of the wheel.

The crown 520, illustrated alone in FIG. 3, has an annular shape and includes a center A. In this example, the crown 520 is a metal part, preferably made of steel.

The crown 520 has a connection portion 522 for securely connecting the crown 520 to the shield 510, and a mounting portion 524, forming a single piece with the connection portion 522, the mounting portion 524 being radially located between the center A of the crown 520 and the connection portion 522. In other words, the mounting portion 524 radially extends inside the connection portion 522.

In other words, the connection portion 522 forms an outer peripheral contour 523 of the crown, while the mounting portion 524 is disposed on the inner periphery of the annular crown 520.

The mounting portion 524 includes a plurality of mounting elements 530 allowing mounting the crown 520 on the rim 300. To this end, the mounting portion 524 includes a plurality of lug-shaped protuberances 540 distributed along the circumference of the mounting portion 524 while being angularly spaced from each other.

Each protuberance 540 radially protrudes towards the center A of the crown and comprises a mounting element 530.

In this example, the mounting portion includes eight protuberances 540 and mounting elements 530 which are angularly spaced by an angle β of the order of 45 degrees. The angle β between two adjacent mounting elements 530 is considered in a plane perpendicular to the axis X of the crown passing through the center A.

In other words, in this non-limiting example, the mounting elements 530 are evenly distributed over the circumference of the mounting portion 524.

The mounting elements 530 advantageously include orifices 532 to receive some of the rim fixing members 314, and more specifically some of the studs 316 of the rim, referenced 316a. In this example, it is observed that each protuberance 540 includes a single mounting element 530, namely a single orifice 532.

As explained above, the fixing of the crown on the rim is made by the fact that the orifices 532 are engaged with some of the studs 316*a* of the rim, the nuts 318*a* associated with these studs are screwed against the mounting portion in order to block the crown between the nuts and the second rim portion.

Referring again to FIGS. 1 and 2, it is observed that the mounting portion 524 radially extends towards the center A out of the inner peripheral segment 514 of the shield. The connection portion 522 is for its part embedded in the inner peripheral segment 514.

The connection portion 522 moreover includes holding elements 550 which, in this example, are composed of holes 552 having an oblong shape and passing axially through the crown while being disposed along the circumference of the fixing portion. More specifically, the holes 552 are located on the external perimeter of the crown.

To make the connection between the shield and the crown, the protection device further includes textile yarns 560 which cooperate with the holding elements by being engaged in the holes 552 so as to extend on either side of the connection portion 522. These yarns are embedded in the polymer material so as to ensure the holding of the shield to the crown. As illustrated in FIG. 6, it is observed that the yarns 560 extend along the radial width of the shield.

As illustrated in FIG. 6, the shield includes in this example at least one reinforcement 570, preferably a knitted fabric. The latter is preferably metallic. The knitted metal fabric preferably extends over the entire circumference of the shield and over substantially its entire radial width. It has the effect of increasing the resistance of the shield to cuts without preventing its deformability.

The invention claimed is:

1. A protection device for protecting a tire of a wheel, including:
- a shield having an annular shape and comprising a polymer material, the shield having an outer peripheral edge and an inner peripheral segment opposite to the outer peripheral edge; and
- a crown for mounting the protection device on a rim of the wheel, the crown having a center and being secured to the shield and comprising:
  - a connection portion for securely connecting the crown to the shield, wherein the connection portion includes holding elements, wherein the protection device further includes textile yarns which cooperate with the holding elements while being embedded in the polymer material; and
  - a mounting portion, forming a single piece with the connection portion, provided with a plurality of mounting elements for mounting the crown on the rim, the mounting portion being radially located between the center and the connection portion and including a plurality of lug-shaped protuberances distributed along the circumference of the mounting portion while being angularly spaced from each other, each protuberance radially protruding towards the center of the crown and comprising at least one of the mounting elements.

2. The protection device according to claim 1, wherein the mounting elements comprise orifices to receive members for fixing the rim.

3. The protection device according to claim 2, wherein each protuberance includes one of the orifices.

4. The protection device according to claim 1, wherein the mounting portion radially extends towards the center of the crown out of the inner peripheral segment of the shield.

5. The protection device according to claim 1, wherein the connection portion is embedded in the inner peripheral segment of the shield.

6. The protection device according to claim 1, wherein the holding elements are holes which axially pass through the crown by being disposed along the circumference of the fixing portion, the textile yarns being engaged in the holes so as to extend on either side of the connection portion.

7. The protection device according to claim 1, wherein the polymer material is an elastomer.

8. The protection device according to claim 7, wherein the elastomer comprises styrene-butadiene.

9. The protection device according to claim 1, wherein the shield further includes at least one reinforcement.

10. The protection device according to claim 9, wherein the at least one reinforcement comprises a knitted fabric made from metal yarns.

11. The protection device according to claim 1, wherein the crown is metallic.

12. A rolling assembly including:
- a wheel comprising a rim provided with an internal flange and an external flange, the rim being composed of a first rim portion including the internal flange, and a second rim portion including the external flange, the first and second rim portions being fixed to each other by fixing members,
- the wheel including a tire having at least one sidewall, and first and second beads mounted against the internal and external flanges of the rim; and
- a tire-sidewall protection device including:
- a shield having an annular shape and comprising a polymer material, the shield having an outer peripheral edge and an inner peripheral segment opposite to the outer peripheral edge;
- a crown for mounting the tire-sidewall protection device on the rim of the wheel, the crown having a center and being secured to the shield and comprising:
  - a connection portion for securely connecting the crown to the shield, wherein the connection portion is embedded within the inner peripheral segment of the shield, such that the connection portion is sealed within the polymer material constituting the shield, and wherein the shield extends radially over at least half of a radial height of the sidewall;
  - a mounting portion, forming a single piece with the connection portion, provided with a plurality of mounting elements for mounting the crown on the rim, the mounting portion being radially located between the center and the connection portion and including a plurality of lug-shaped protuberances distributed along the circumference of the mounting portion while being angularly spaced from each other, each protuberance radially protruding towards the center of the crown and comprising at least one of the mounting elements,
- the crown being fixed to the rim and the mounting elements of the crown being mounted on at least some of the fixing members.

13. The rolling assembly according to claim 12, wherein the outer peripheral edge of the shield contacts the sidewall of the tire by exerting a pressure against said sidewall.

14. The rolling assembly according to claim 12, wherein the number of mounting elements is strictly smaller than the number of fixing members.

15. The rolling assembly according to claim 14, wherein the number of mounting elements is less than or equal to half the number of fixing members.

16. The rolling assembly according to claim 12, wherein the crown is fixed via the mounting elements to one every two or every three fixing members.

17. The rolling assembly according to claim 12, wherein one of the fixing members is disposed between two adjacent protuberances.

18. The rolling assembly according to claim 12, wherein the fixing members comprise studs axially protruding from the second rim portion.

19. The rolling assembly according to claim 12, wherein the shield has a bent annular shape with a curved cross-section.

20. The rolling assembly according to claim 19, wherein the outer peripheral edge is configured to bear against the at least one sidewall of the tire.

\* \* \* \* \*